United States Patent [19]

Dickson

[11] Patent Number: 4,919,355
[45] Date of Patent: Apr. 24, 1990

[54] LOCKING PAWL ACTUATING MEANS FOR EMERGENCY LOCKING SAFETY BELT RETRACTOR

[75] Inventor: Ronald Dickson, Troy, Mich.

[73] Assignee: Allied-Signal Inc., Morris Township, Morris County, N.J.

[21] Appl. No.: 220,771

[22] Filed: Jul. 18, 1988

[51] Int. Cl.⁵ .............................................. B60R 22/40
[52] U.S. Cl. .............................................. 242/107.4 A
[58] Field of Search ................. 242/107.4 A, 107.4 B; 280/806; 297/478, 480

[56] References Cited

U.S. PATENT DOCUMENTS

| | | | |
|---|---|---|---|
| 4,187,995 | 2/1980 | Rex | 242/107.4 A |
| 4,726,540 | 2/1988 | Ches et al. | 242/107.4 A |
| 4,726,541 | 2/1988 | Tsukamoto et al. | 242/107.4 A |

Primary Examiner—John M. Jillons
Attorney, Agent, or Firm—Markell Seitzman

[57] ABSTRACT

An emergency locking safety belt retractor having a safety belt storage spool, a locking ratchet turnable with the spool, a locking pawl for preventing spool rotation when engaged with the locking ratchet, a programming ratchet turnable with the spool and a locking pawl actuating means operable in response to a change in vehicle inertia sensed by a vehicle inertial sensor has an improvement in such locking pawl actuating means including the provision of a flexible member having a programming ratchet engageable tooth provided thereon, a connection between such member and the locking pawl for moving the locking pawl into a lockup with the spool mounted ratchet when the member is moved in response to a change in vehicle inertia sensed by the associated sensor and a closed loop cam way is associated with a follower on the member which causes the flexible member to store energy while being moved by the programming ratchet to cause the locking pawl lockup which is released after such lockup and then moved in a manner to cause the flexible member to return to a position of rest in a reset mode without being dependent upon a spool retractive movement or a release of the locking pawl to accomplish the reset movement.

11 Claims, 2 Drawing Sheets

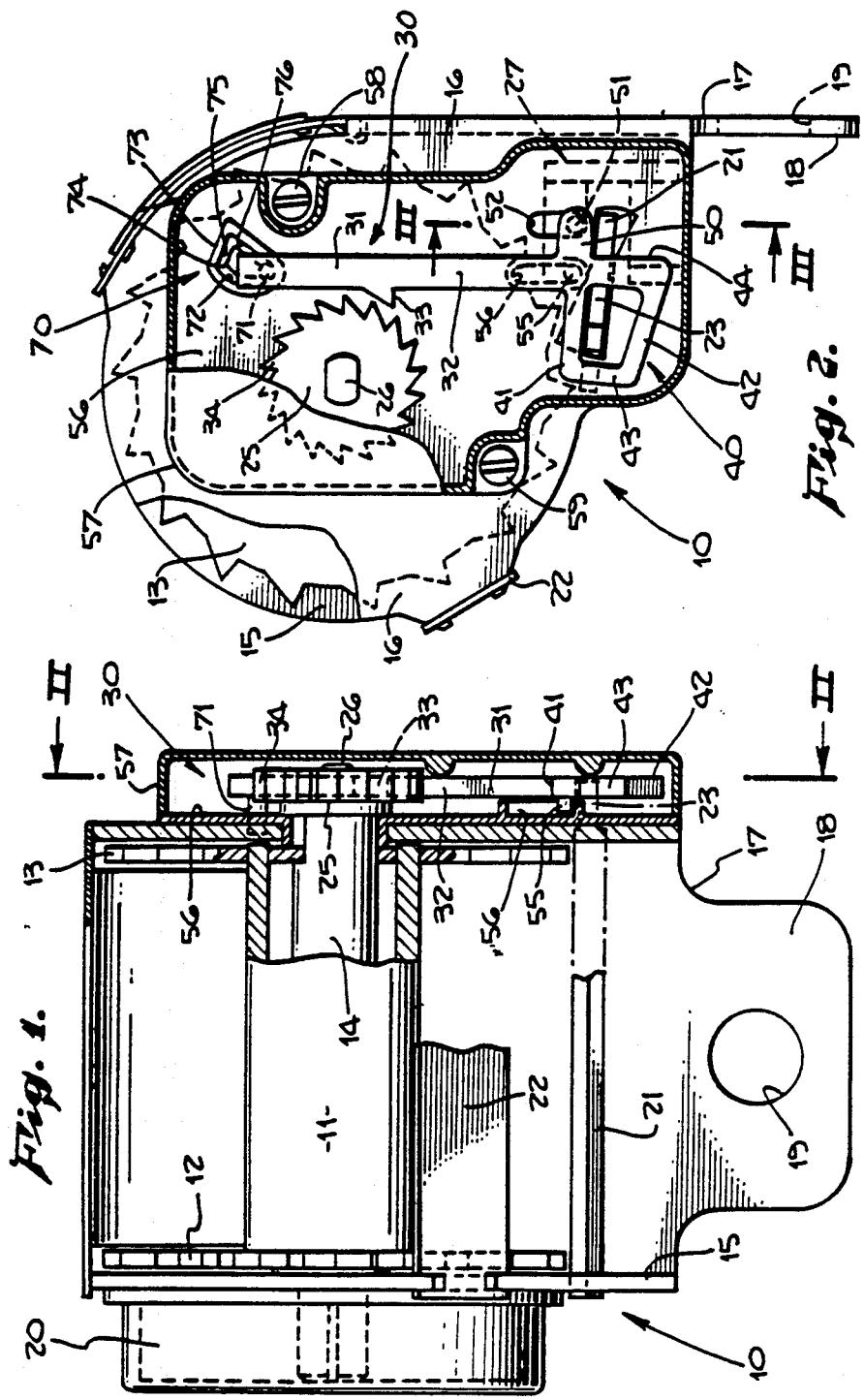

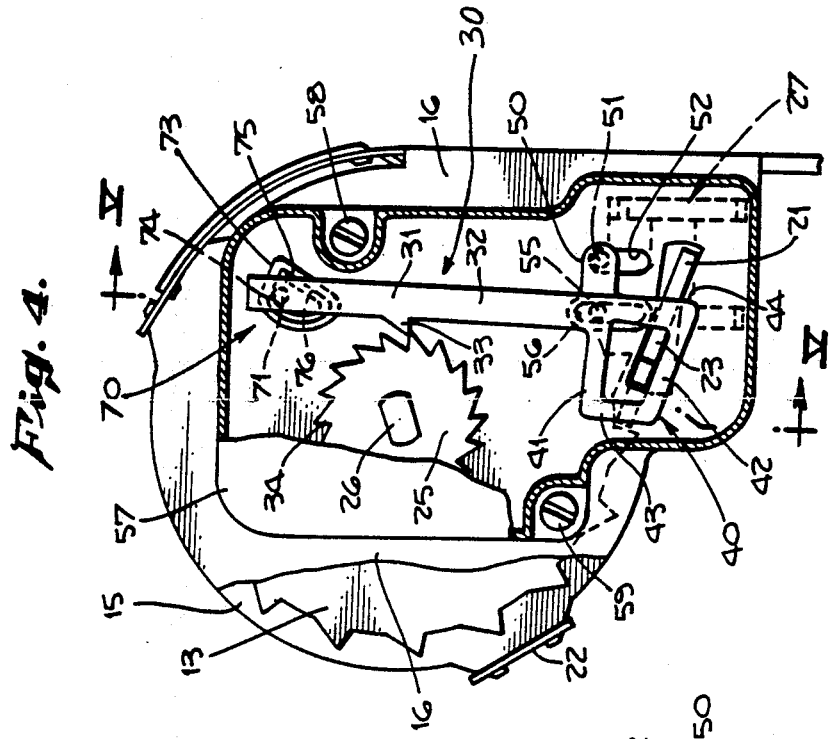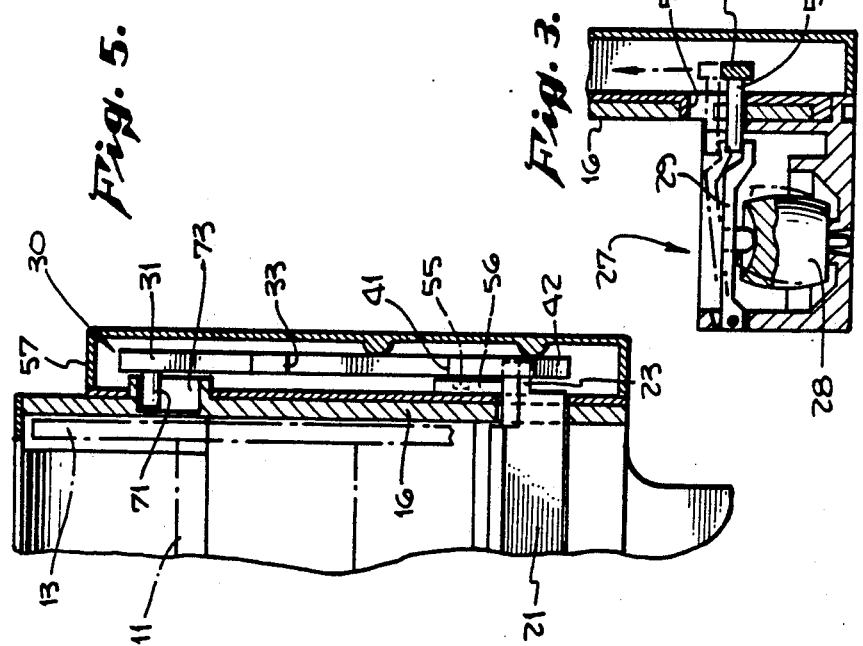

LOCKING PAWL ACTUATING MEANS FOR EMERGENCY LOCKING SAFETY BELT RETRACTOR

BACKGROUND OF THE INVENTION

This invention relates in general to emergency locking safety belt retractors of the type having a programming pawl and programming ratchet which are initially engaged in order to control the lockup of a locking pawl with a spool associated one or more locking ratchets and more specifically to an improvement in the locking pawl actuating means whereby such actuating means is reset to a start position without the need for a retractive movement of the safety belt webbing spool or a release of the locking pawl from the locking ratchets.

Emergency locking safety belt retractors are in general use in association with safety belts and safety belt harnesses employed for restraining passengers in their seats in vehicles such as automobiles, watercraft and aircraft. In such emergency locking safety belt retractors which are responsive to a change in inertia of the vehicle to cause lockup of the retractor, it is common to employ a programming pawl, operated in response to a vehicle inertia sensor sensing such change in inertia of the vehicle, engaging a programming ratchet with the continued spool rotation due to the webbing pay out as the safety belt or harnesses pulls against the retractor causing operation of a locking pawl actuator device or apparatus to move the locking pawl into a locking engagement with the spool associated locking ratchets. Since spool rotation ceases when the locking pawl engages the locking ratchet teeth in a lockup condition, it is common to provide only sufficient resiliency to the locking pawl actuating apparatus or device as to facilitate the engagement between the programming pawl and programming ratchets, usually made of plastic parts, while the locking pawl and locking ratchets are made of metal, so as to avoid damaging retractor parts. In such situations, it is also common to require a release of the locking pawl from the locking ratchets and the attendant retractive movement of the safety belt retractor spool under the urging of its rewind spring in order to return the locking pawl actuating apparatus or device to a start or rest position from which it can be operated once again to cause a programmed lockup of the locking pawl and locking ratchets.

With the foregoing in mind, it would be desirable to employ a construction and mode of operation for a locking pawl actuating apparatus or device in an emergency locking retractor of otherwise conventional construction which would be automatically reset to a start position, or position of rest, following its actuation of the locking pawl into a lockup condition with the locking ratchets without the need for there being a release of the locking pawl from the locking ratchets or a rewinding movement of the safety belt webbing storage spool. Such an actuating apparatus would thus position itself ready to function again and again without relying on the inner action of other components of the retractor which are, when actuated, functioning to ensure against further protraction of the safety belt webbing off of the retractor.

SUMMARY OF THE INVENTION

It is a primary object of the present invention to disclose and provide an improved locking pawl actuating means for an emergency locking safety belt retractor wherein such actuating means responds to an impetus provided by a conventional vehicle inertia sensor, engages a programming pawl with a programming ratchet so that continued turning movement of the programming ratchet operates the programming pawl to cause lockup of the associated locking pawl and locking ratchets connected to the spool and specifically wherein the actuating means, in accomplishing said locking pawl lockup, stores energy imparted thereto from the protraction of the webbing and concomitant spool rotation, which is thereafter released in a resetting mode of operation for the actuating means to return it to a start or position of rest. It is a further object of the present invention to provide such a locking pawl actuating means which does not rely upon a safety belt retractor spool retractive movement and/or locking pawl releasing motion of the locking pawl to cause movement of the locking pawl actuating means components to a position wherein they are ready to be operated again in response to an associated vehicle inertia sensor to cause lockup of the retractor.

Generally stated, the improved locking pawl actuating means for an emergency locking safety belt retractor, in accordance with the present invention, includes the provision of a resilient, flexible member having a programming ratchet engageable tooth provided thereon, a member actuating means associated with a vehicle inertia sensor of the retractor and the flexible member for moving the latter from a start position through an initial movement to bring the tooth into engagement with a programming ratchet of the retractor when there is a change in vehicle inertia sensed by the sensor, a connection between the flexible member and the locking pawl of the retractor for moving the locking pawl into engagement with locking ratchets associated with the retractor spool when the flexible member is moved a predetermined extent under urging by the programming ratchet and a camming means for camming the flexible member in an energy storage flexed movement and then directing it out of engagement with the programming ratchet through an energy releasing flexing movement of the flexible member wherein it tends to return to its unflexed state after the member has moved the locking pawl sufficiently far to engage it with the locking ratchets. More specifically, the flexible member preferably comprises a laterally flexible elongated body having its longitudinal extent vertically oriented in the retractor adjacent the programming ratchet with the programming ratchet engaging tooth thereof facing the programming ratchet.

The camming means preferably includes a cam follower provided on an upper portion of the flexible member body and a cam way provided on a retractor side wall positioned to receive and guide the follower in such a manner to flex the body upper portions initially laterally toward the ratchet wheel to store energy in the flexible and resilient body and then allow a spring like reaction of the flexible body toward its unflexed condition when the follower reaches another portion of the cam way to thereby free the programming ratchet engaging tooth from the programming ratchet.

A more complete understanding of the improved locking pawl actuating means in accordance with the present invention as well as realization of additional advantages and objects thereof will be afforded to those skilled in the art from a consideration of the following detailed description of a preferred exemplary embodiment thereof. Reference will be made to the appended sheets of drawings which will be first briefly described.

BRIEF DESCRIPTION OF THE DRAWINGS

FIG. 1 is a front view, partially in section, of an otherwise conventional emergency locking safety belt retractor employing a preferred exemplary embodiment of the improved locking pawl actuating means of the present invention;

FIG. 2 is a side view, partially in section, of the retractor and exemplary locking pawl actuating means of claim 1 taken therein along the plane II—II;

FIG. 3 is a detail view, taken in section along the plane III—III in FIG. 2 showing the vehicle inertia sensor of the exemplary retractor.

FIG. 4 is a side view of the retractor and exemplary locking pawl actuating means as in FIG. 2 showing the flexible elongate body of the locking pawl actuating means in a programming ratchet release mode following seating of the locking pawl against the locking ratchet; and FIG. 5 is a section view through the exemplary locking pawl actuating means and retractor of FIG. 4 taken therein along the plane V—V.

DETAILED DESCRIPTION OF THE PREFERRED EXEMPLARY EMBODIMENT

Referring now to FIG. 1 initially, an exemplary embodiment of an otherwise conventional emergency locking retractor is illustrated generally at 10 which employs the preferred exemplary embodiment of improved locking pawl actuating means, indicated generally at 30, provided in accordance with the present invention. As is known in the art, emergency locking retractors of the type illustrated comprise a safety belt webbing roll up spool 11 having locking ratchets 12 and 13 mounted to the spool ends in fixed non-turnable relation thereto. The spool 11 and locking ratchets 12 and 13 are assembled on a spool shaft 14 which is journalled in the side walls 15 and 16 of the retractor frame 17 which also includes a base wall 18 having a mounting bolt aperture 19 for securing the retractor frame within a vehicle in a position of use. Safety belt webbing, as illustrated, is typically wound upon spool 11 and protracted from the retractor during use as part of a safety belt harness in a manner known in the art. A conventional windup spring is provided within the spring housing 20 for rewinding the webbing in known manner.

A locking pawl 21 is provided which may be actuated into engagement with the locking ratchets 12 and 13 by pivoting locking pawl 21 relative its pivotal mounting to retractor side walls 15 and 16 in response to an emergency condition. As seen in FIGS. 1 and 5, locking pawl 21 is pivotally mounted in cut outs in side walls 15 and 16, the spacing of which is braced by cross brace 22, and is provided with a pawl connecting arm 23 which extends laterally, to the right in FIGS. 1 and 5, outwardly of the said walls 16 where it may be engaged by a locking pawl actuating means for pivoting the locking pawl 21 into engagement with the locking ratchets 12 and 13. As is contemplated by the within invention, an improved locking pawl actuating means, indicated generally at 30, is provided for acting upon locking pawl 21, and specifically in the exemplary embodiment upon the locking pawl connecting arm 23.

As is also presently well known in the art, it is common to provide an emergency locking retractor with a programming ratchet, as ratchet 25 as seen in FIG. 2, which is mounted on the reduced diameter end 26 of spool axial 14 for turning movement concurrently with the spool. The programming ratchet 25 is normally made of a lightweight plastic material, has the same number of teeth as the locking ratchets and is "programmed" so as to facilitate the associated locking pawl actuating means for pivoting the locking pawl 21 into engagement with the locking ratchets at locations thereon between the locking ratchet teeth as opposed to an undesired tooth to tooth abutment as might otherwise occur between the locking pawl and the locking ratchet. The locking pawl is thus seated against the associated ratchet wheels between locking teeth thereof with further rotational movement of the spool causing the locking ratchets to rotate into a lockup condition with the locking pawl 21. It is also common practice to employ a vehicle inertia sensor, as indicated, generally at 27 in FIG. 3, for initiating operation of the locking pawl actuating means. In the present exemplary embodiment, such sensor includes a tiltable mass 28 which lifts sensor arm 29 when a change in vehicle inertia of more than a predetermined amount, as is known in the art, is sensed by the sensor.

As is particularly contemplated within the present invention, the locking pawl actuating means of the present invention, and as indicated generally at 30, includes a flexible member 31 which facilitates movement of the locking pawl 21 into engagement with the locking ratchets 12 and 13, upon a tilting movement of sensor 28 which lifts the sensor arm 29, in such a manner that the locking pawl actuating means resets itself to a start position, after causing said locking pawl lockup, without the need for a retractive movement of the safety belt webbing to occur to allow resetting of the locking pawl actuating means.

As seen in FIG. 2, the exemplary embodiment of flexible member 31 comprises an elongated resilient material body 32 of somewhat rectangular bar configuration having a programming ratchet engageable tooth 33 formed integrally thereof. Tooth 33 functions as the programming pawl in the present embodiment and is adapted to be engaged by any one of the teeth 34 of the programming ratchet 25 when the flexible member 31 is raised vertically from its start position as illustrated in FIG. 2. Member 31 is oriented vertically within the retractor, as seen in FIG. 2 with the longitudinal extent of body 32 being substantially vertical relative the retractor in such manner that it lies generally adjacent to the programming ratchet 25 with the tooth 33 facing the programming ratchet 25 and its teeth 34, it being assumed for the present discussion that the retractor is in an upright position of installation as shown in FIGS. 1 and 2 relative to its associated vehicle.

Locking pawl connecting means are associated with the locking pawl 21 and flexible member 31, such means being indicated generally at 40 in FIGS. 2 and 4 and includes an upper pawl abutment arm 41, a lower pawl abutment arm 42, a front connecting web 43 and a rear connecting web 44, all of which are formed integrally of the body 32 of flexible member 31. The upper and lower abutment arms 41 and 42 extend laterally of the body 32, to the left in FIGS. 2 and 4, and are spaced relative one another sufficient to provide a lost motion connection between the body 32 and the pawl 21, such connection being afforded through the engagement of the locking pawl connecting arm 23 and the abutment arms 41 and 42. As is apparent from a comparison of FIGS. 2 and 4, the upper arm 41 rests on the top of connecting arm 23 when the flexible member 31 is in its start position of rest as seen in FIG. 2 and, when it is lifted vertically as subsequently described, the lower abutment arm 42 is moved upwardly until it comes into engagement with the underside of connecting arm 23 and lifts the same vertically to pivot the associated locking pawl 21 from the position of FIG. 2 into an abutting engagement with the nearest surface of each of the associated locking ratchets 12 and 13. The programming ratchet is provided so that such abutment between the locking pawl 21 and the locking ratchets 12 and 13 occurs approximately midway between the teeth of the locking ratchets so that while upward movement of flexible member is essentially halted by the engagement with the locking pawl connecting arm 23 and the locking pawl 21 butting the ratchets 12 and 13, continued rotation of the safety belt retractor spool and locking ratchets toward a position of lockup continues rotation of the programming ratchet 25 for a short period of time during which the turning engagement between programming ratchet 25 and tooth 33 continues an upward bias on the member 31 which is flexed thereby as discussed hereinafter.

The lifting of flexible member 31 in response to the sensor, indicated generally at 27, sensing a change in vehicle inertia is accomplished in the exemplary embodiment through the provision of member lift arm 50, preferably formed integrally of the member body 32 as seen in FIGS. 2 and 3, with a lift pin 51 being provided to extend through slot 52 in the side wall 16 of the retractor with the pin 51 lying on sensor arm 29 as best seen in FIG. 3. On tilting movement of sensor mass 28, sensor arm 29 lifts pin 51 which in turn lifts the lift arm 50 and associated flexible member body 32 in a vertical direction as seen in FIGS. 2, 3 and 4. During such lifting movement, a substantially vertical only movement is provided to the lower portions of the body 32 through the provision of the additional guide pin 55, as seen in FIGS. 1 and 5, which rides in vertical slot 56 provided in the inner side wall 56 of the housing 57 which is secured by appropriate fasteners, such as screws 58 and 59 to the retractor side wall.

Camming means are provided for directing the flexible member 31 out of engagement with the programming ratchet 25 in a flexing movement of member 31 under the urging of the turning movement of the ratchet 25, such camming means being indicated generally at 70 in the exemplary embodiment. As noted previously, an initial movement is provided to the flexible member 31 when the sensor arm 29, lift pin 51 and lift arm 50 raise the flexible member 31 sufficiently to bring the programming pawl tooth 33 into engagement with the programming ratchet 25. Continued rotation of the spool in an emergency condition prior to lockup turns the programming ratchet 25 to lift the flexible member 31 in a programming movement which extends from when the tooth 33 engages the programming ratchet 25 until the locking pawl 21 abuts the ratchets 12 and 13 between the locking ratchet teeth. During the programming movement or lifting of flexible member 31 from the start position of FIG. 2, the cam follower 71 provided on an upper end of body 32 rides in a first way 72 of the cam way 73, the way 72 as seen in FIG. 2 being curved inwardly and upwardly relative the programming ratchet 25 so that the upper portions of flexible body 32 are flexed inwardly toward the ratchet wheel until the follower 71 approaches the upper end of first way 72. The flexible member 31 is thereby tensioned to be ready to spring away from the ratchet wheel 25, to thereby release tooth 33 from the ratchet wheel 25 immediately prior to the top of the travel of the flexible member 31, it being apparent from a comparison of FIGS. 2 and 4 that as the follower 71 approaches the top of cam way 73, it traverses over the top of the juncture 74 between first way 72 and second way 75 and is thereby freed to spring laterally to the right in FIGS. 2 and 4 pulling the tooth 33 away from the programming ratchet 25. Second way 75 is inclined downwardly and to the right to facilitate imparting a downward movement to flexible member 31 as the energy stored therein from the tensioning thereof as it flexed during its movement along first way 72 is freed and the follower springs down the inclined second way 75. Immediately prior to the top of travel of the flexible member 31, the lock bar 21 approaches a lockup condition as seen in FIG. 2.

Following springing of the flexible member 31 free of the programming ratchet 25 as its follower 71 travels over the juncture 74 between first way 72 and second way 75, the flexible member 31 returns to its start position of rest as its follower 71 travels down the third downwardly and inwardly inclined way 76 which merges into the beginning of way 72, the lower portions of body 32 being vertically guided by the guide pin 55 riding in its associated guide slot 56.

As can be seen from the foregoing detailed description of a preferred exemplary embodiment of the improved locking pawl actuating means in accordance with the present invention, the locking pawl actuating means operates in association with the programming pawl and programming ratchet to bring the locking pawl into a lockup effecting relationship with the locking ratchets in response to rotation of the associated spool due to safety belt webbing pay out during the emergency condition, but, after affecting such lockup, returns to its position of rest or start position due to its stored energy caused by its flexing about the disclosed camming means without relying upon a release of the locking bar from the locking ratchets or a rewind rotation of the safety belt spool to set the locking pawl actuating means in a reset condition ready for future actuation. Having thus described a preferred exemplary embodiment of the improved locking pawl actuating means in accordance with the present invention, it should be apparent to those skilled in the art that various modifications, adaptations and equivalent constructions and components employing the mode of operation of the within locking pawl actuating means for emergency locking safety belt retractors may be accomplished within the scope and spirit of the within invention which is defined by the following claims:

I claim:

1. In an emergency locking safety belt retractor having a safety belt storage spool, a locking ratchet turnable with the spool, a locking pawl for preventing spool rotation when engaged with said locking ratchet, a programming ratchet turnable with said spool and a locking pawl actuating means operable in response to a change in vehicle inertia sensed by a vehicle inertia sensor, the improvement in locking pawl actuating means comprising:

a flexible member having a programming ratchet engaging tooth;

member actuating means associated with said sensor and member for moving said member from a start position through an initial movement to place said tooth into engagement with said programming ratchet when a change in vehicle inertia is sensed by said sensor;

connecting means associated with said locking pawl and said member for moving said locking pawl into engagement with said locking ratchet when said member is moved through a programming movement thereof under the urging of said programming ratchet turning against said member tooth after said tooth has been placed in engagement with said programming ratchet by said initial movement of said member; and camming means for camming said flexible member into a flexed condition and thereafter directing it out of engagement with said programming ratchet in a flexing and unflexing movement of said member under the urging of said programming ratchet turning against said tooth after said programming movement of said member has moved said locking pawl into engagement with said locking ratchet preliminary to lock up of said locking pawl and locking ratchet and while said member remains connected to said locking pawl by said connecting means.

2. The improvement in locking pawl actuating means of claim 1 wherein said flexible member comprises:
a laterally flexible, resilient elongated body having its longitudinal extent vertically oriented in said retractor adjacent said programming ratchet with said tooth facing said programming ratchet.

3. The improvement in locking pawl actuating means of claim 2 wherein said camming means comprises:
a cam follower provided on an upper portion of said body; and
a cam way provided on said retractor to receive and guide said follower in order to flex said body via said body upper portion being moved laterally toward said ratchet wheel in a manner to store energy in said member and thereafter guiding said member as it releases said energy in an unflexing movement to disengage said tooth from said programming ratchet.

4. The improvement in locking pawl actuating means of claim 3 wherein:
said tooth is provided in a mid portion of said body whereby said tooth, when in engagement with said programming ratchet, is positioned between said connecting means and said follower.

5. The improvement in locking pawl actuating means of claim 3 wherein said locking pawl has a pawl connected arm for pivoting the pawl into locking engagement with the locking ratchet and wherein said connecting means comprises:
a lost motion connection between said body and said locking pawl including the provision of upper and lower abutment arms extending from said body in spaced relation and positioned to receive said pawl connected arm therebetween.

6. The improvement in locking pawl actuating means of claim 5 wherein said upper and lower abutment arms are formed integrally of said body.

7. The improvement in locking pawl actuating means of claims 2, 3, 4, 5, or 6 wherein:
guide means are provided for guiding movement of a lower portion of said body in a substantially vertical direction only while said body flexes in its movements.

8. The improvement in locking pawl actuating means of claim 3 wherein said cam way includes a plurality of connected ways in which said follower travels and which include:
a first way which curves upwardly and inwardly laterally toward said programming ratchet to initially cam said follower inwardly toward said programming ratchet as it moves upwardly during a first part of said flexing movement of said member;
a second way which is inclined downwardly and away from the upper end of said first way; and
a third way which is inclined downwardly from the end of said second way and inwardly to the beginning of said first way in a closed loop, whereby said follower is initially driven upwardly and inwardly toward said programming ratchet flexing said member toward said programming ratchet until it springs over the juncture of said first and second ways, releasing said tooth from said programming ratchet and providing an impetus to said member to return to its start position with said follower riding down said third way to the beginning of said first way.

9. An improved locking pawl actuating means for an emergency locking safety belt retractor having a safety belt storage spool, a locking ratchet turnable with the spool, a locking pawl for preventing spool rotation when engaged with said locking ratchet, a programming ratchet turnable with said spool, a programming pawl for engaging the programming ratchet and a vehicle inertia sensor for actuating the programming pawl into engagement with the programming ratchet comprising:
a flexible member having said programming pawl mounted thereon and being connected with said locking pawl by connecting means so that movement of said member of a given extent causes engagement of said locking pawl with said locking ratchet;
member actuating means associated with said vehicle inertia sensor for initiating movement of said member to bring said programming pawl into engagement with said programming ratchet in response to a change in vehicle inertia sensed by said sensor; and
member guide means for guiding movement of said member imparted thereto by turning of said programming ratchet when engaged by said programming pawl to cause said engagement of said locking pawl with said locking ratchet and for guiding said member out of engagement with said programming ratchet as said locking pawl approaches a lock up condition with said locking ratchet thereby stopping rotation of said spool and of said programming ratchet.

10. The improved locking pawl actuating means of claim 9 wherein said member guide means comprises:
camming means for camming said flexible member out of engagement with said programming ratchet, under the urging of said programming ratchet turning against said programming pawl, while said member is engaged with said locking pawl when the locking pawl has seated against the locking ratchet and is moving into a lockup condition with said locking ratchet.

11. An improved locking pawl actuating means for a emergency locking safety belt retractor having a webbing storage spool provided with one or more locking ratchets and a locking pawl to prevent webbing protraction of said spool when said locking pawl engages said one or more locking ratchets, said pawl actuating means comprising:
a resilient member capable of storing energy when flexed so as to provide a bias therein to return to its unflexed condition when not constrained;
member actuating means including an inertia sensor for initiating member movement from a position of rest in response to a predetermined change in inertia experienced by the retractor and means driven by spool rotation for continuing said member movement once initiated;
said member being connected to said locking pawl whereby member movement of a predetermined amount causes said locking pawl to engage said one or more locking ratchets;
means for flexing said resilient member only during a given extent of member movement in response to spool rotation until said locking pawl engages said one or more locking ratchets, said member being released to flex back to its unflexed condition after moving said given extent of movement; and
means for guiding said member to return to its position of rest in response to movement imparted to said member by its bias to return to its unflexed condition.

* * * * *